(12) United States Patent
Terwilleger

(10) Patent No.: US 8,117,990 B2
(45) Date of Patent: Feb. 21, 2012

(54) NIPPLE FOR FEEDING LIQUIDS TO CALVES AND OTHER MAMMALS

(75) Inventor: Arthur Raymond Terwilleger, Plattsburg, MO (US)

(73) Assignee: West Agro Inc., Kansas City, MO (US)

( * ) Notice: Subject to any disclaimer, the term of this patent is extended or adjusted under 35 U.S.C. 154(b) by 458 days.

(21) Appl. No.: 12/370,325

(22) Filed: Feb. 12, 2009

(65) Prior Publication Data

US 2010/0200530 A1    Aug. 12, 2010

(51) Int. Cl.
*A01K 9/00* (2006.01)
*A61J 11/00* (2006.01)

(52) U.S. Cl. .......................................... 119/71; 215/11.1

(58) Field of Classification Search ............... 215/11.1; D30/121; 606/234; 119/71
See application file for complete search history.

(56) References Cited

U.S. PATENT DOCUMENTS

| | | | | |
|---|---|---|---|---|
| RE11,086 | E | * | 6/1890 | Eggers ........................ 215/11.5 |
| 697,304 | A | * | 4/1902 | Whitford ........................ 119/71 |
| 732,630 | A | * | 6/1903 | Hall, Jr. ........................ 119/71 |
| 805,641 | A |  | 11/1905 | Gallagher |
| 1,002,426 | A | * | 9/1911 | Moore ........................ 119/71 |
| 1,146,639 | A |  | 7/1915 | Miller |
| 1,297,207 | A | * | 3/1919 | McMann ........................ 215/11.1 |
| 1,510,571 | A |  | 11/1924 | Ware |
| 1,902,433 | A |  | 3/1933 | Brown |
| 2,163,330 | A | * | 6/1939 | Snapp ........................ 119/71 |
| 2,513,896 | A |  | 7/1950 | Searer |
| 2,616,581 | A |  | 11/1952 | Madsen et al. |
| 2,630,932 | A | * | 3/1953 | Lestakis ........................ 215/11.1 |
| 2,688,326 | A |  | 9/1954 | Lerman |
| 2,699,778 | A |  | 1/1955 | Ezell |
| 3,113,569 | A | * | 12/1963 | Barr et al. ........................ 215/11.1 |
| 3,211,316 | A | * | 10/1965 | Fischer ........................ 215/328 |
| 3,292,809 | A | * | 12/1966 | Shomock et al. ............ 215/11.5 |
| 3,593,870 | A |  | 7/1971 | Anderson |
| 4,993,568 | A |  | 2/1991 | Morifuji et al. |

(Continued)

FOREIGN PATENT DOCUMENTS

GB    1312408    4/1973

(Continued)

OTHER PUBLICATIONS

Canadian Office Action, Dated Feb. 3, 2011, in Application No. 2,690,946.

*Primary Examiner* — Sue Weaver

(74) *Attorney, Agent, or Firm* — Young & Thompson

(57) ABSTRACT

An improved nipple for feeding liquids to newborn and young bovine calves and other mammals. A horizontal flat portion of an upper end of the nipple has a downward curving periphery that merges into a vertical portion of a barrel at an exterior radius of 9 to 10 mm and an interior radius of 6.5 to 7.5 mm. The thickness of a wall of the upper end of the nipple is between 5 and 10% less than the thickness of the wall of the barrel. The flat portion of the upper end of the nipple 1 has a diameter in the range of 5 to 7 mm, which is about 20 to 25% of the inner diameter of the barrel. A bump-out may be formed on a base of the nipple to aid in removing and replacing the nipple on a bottle.

20 Claims, 3 Drawing Sheets

U.S. PATENT DOCUMENTS

| | | | |
|---|---|---|---|
| 5,101,991 A | 4/1992 | Morifujo et al. | |
| 5,129,532 A * | 7/1992 | Martin | 215/11.1 |
| 5,474,028 A | 12/1995 | Larson et al. | |
| 5,544,766 A * | 8/1996 | Dunn et al. | 215/11.1 |
| 5,769,285 A | 6/1998 | Upham et al. | |
| 5,784,999 A | 7/1998 | Larson et al. | |
| 5,797,505 A | 8/1998 | Kaura | |
| 6,003,698 A | 12/1999 | Morano | |
| 6,616,000 B1 | 9/2003 | Renz | |
| 6,645,228 B2 | 11/2003 | Renz | |
| 6,884,229 B2 | 4/2005 | Renz | |
| 6,994,225 B2 * | 2/2006 | Hakim | 215/11.4 |
| 7,004,339 B2 | 2/2006 | Renz | |
| 7,036,975 B2 | 5/2006 | Renz | |
| 7,122,045 B2 | 10/2006 | Randolph et al. | |
| 7,185,775 B1 | 3/2007 | Decal | |
| 7,326,234 B2 | 2/2008 | Lieberman | |
| 2007/0102388 A1 | 5/2007 | Lewis et al. | |
| 2007/0131637 A1 | 6/2007 | Tamera et al. | |

FOREIGN PATENT DOCUMENTS

| | | |
|---|---|---|
| WO | 9521523 | 8/1995 |

* cited by examiner

NIPPLE FOR FEEDING LIQUIDS TO CALVES AND OTHER MAMMALS

FIELD OF INVENTION

The field of the invention is nipples that attach to bottles or other reservoirs used to feed milk, milk replacer, or other liquids to newborn and young bovine calves and other non-human mammals.

DESCRIPTION OF PRIOR ART

Nipples used to feed liquids such as milk and milk replacer to domestic baby calves and other non-human baby mammals are typically made out of resilient elastomers—i.e., rubber like materials. Nipples generally comprise a hollow nipple tube extending from a wider, hollow base. The nipple base is attached around or over an opening in a bottle or other receptacle that contains about two liters of liquid. The calf or other animal suckles on the nipple tube to withdraw the liquid. See Upham U.S. Pat. No. 5,769,285 and Larson U.S. Pat. Nos. 5,474,028 and 5,784,999.

Calf nipples are larger and longer than nipples used to feed human infants. The liquid flow rate is also higher in the case of animals such as calves due to the greater size and strength of the calf and the relatively greater quantity of milk or other liquid needed to feed the animal easily, comfortably, and satisfyingly. Calf nipples should also approximate the shape of cow teats if the nipple is to be comfortable and satisfying to the calf.

The conventional nipple is attached to the liquid container, such as a plastic bottle, via the base in such a way that the liquid is sealed inside the bottle, allowing the bottle and nipple to be inverted with the nipple facing downward. In this position the liquid flows into and fills the nipple cavity and is available to the mammal for extraction through the nipple.

A self sealing orifice or aperture is made in, or formed by, a distal or upper end or tip of the nipple tube. The aperture is opened by the suckling or squeezing action of the calf's mouth. The suckling by the calf, aided by the weight of the liquid in the inverted bottle, causes the liquid to flow into the mouth of the animal through the aperture in the distal end of the nipple. When the calf stops suckling and relaxes its mouth, the nipple returns to its normal shape and the aperture closes, sealing and stopping the flow of the liquid.

The suckling or squeezing action of the calf's mouth removes liquid from the inside of the nipple, creating a partial vacuum inside the nipple. Normally, before the calf or mammal begins to remove liquid feed from the bottle through the aperture or orifice at the distal end of the nipple, the bottle contents will be at approximately atmospheric pressure. When the calf removes liquid through the nipple, the pressure in the bottle is lower than atmospheric pressure. This pressure differential causes air to flow inward through a vent on the nipple base. The vent is created by a thin wall or membrane of nipple material that flexes as the pressure gradient changes on each side of the membrane. The membrane contains a slit or aperture, which is stretched and opened as the membrane flexes due to the pressure change. The opening of the slit in the membrane thus allows air into the bottle to equalize the pressure and make it easier for the calf to suck the liquid from the bottle.

The ease or speed of the animal's withdrawal of liquid from the bottle—i.e. flow rate—is influenced by several factors. One factor is the size of the orifice or aperture in the distal or upper end of the nipple. Many apertures are made by X-shaped slits in the upper end of the nipple. The length of the "X" slit in the nipple end affects the flow rate. Longer slits allow faster withdrawal but risk leakage of liquid, especially as the rubber relaxes or tears with time and use. Smaller slits reduce the flow and slow the consumption of milk by the calf.

The shape of the nipple end also affects the liquid flow rate. The distal ends of conventional calf nipples are usually hemispherical or rounded. (See e.g., Larson U.S. Pat. Nos. 5,474,028 and 5,784,999) See also Upham U.S. Pat. No. 5,769,285, which has a hemispherical end with a ridge around it, the ridge effectively thickening the tubular wall around the slit in the tip or distal end of the nipple. Is such nipples, the distal end has a constant radius over the entire distal end of the nipple. In contrast the end of the typical cow teat is not spherical in shape but is rounded at the outside edge with a flat spot in the middle where the milk canal opening is located.

SUMMARY OF THE INVENTION

The improved nipple is made of flexible and resilient material such as natural rubber, synthetic rubber, or a combination of the two. Thermoplastic elastomers, silicons or other similar materials may be used. Other polymers which provide the needed flexibility and are resistant to cleaning fluids and fats in the liquid feed may also be advantageously used. Such materials, of course, must not be harmful to the animal.

The improved nipple is specifically shaped and dimensioned to increase the flow of liquid, minimize the size of the opening to prolong the effective life of the nipple, and enable the easy installation of the nipple over the open end of the milk receptacle or bottle.

The interior radius of the distal end of the nipple is in the range of 6.5 to 7.5 mm. The outer radius of the distal end of the nipple is in the range of 9 to 10 mm. The flat portion on the distal end of the nipple has a diameter of 5 to 7 mm, which is about 20-25% of the inner diameter of the nipple.

The nipple wall thickness at the upper or distal end is reduced compared to the barrel of the nipple. The wall thickness at the distal end of the nipple is about 2.4 mm, whereas the thickness of the material in the walls of the barrel is about 2.6 mm, a reduction of about 8% in the thickness at the distal end of the nipple.

An X-shaped opening is placed or formed at the distal end of the nipple to allow the milk or liquid feed to exit the nipple and flow into the mouth of the calf.

The improved nipple construction more nearly approximates the shape of a cow teat and allows a higher liquid flow rate. The flat portion at the distal end of the nipple, together with the reduced thickness of the material at the upper end of the nipple, reduces the bending stresses on the flap portions of the nipple between the slits forming the X-shaped opening through which the liquid food flows into the animal's mouth. The reduced bending stresses allow the flap portions to open more easily to allow liquid flow. In addition, when the liquid ceases flowing through the X-shaped slits, the slits close more effectively and provide a better seal than is the case when the slits are formed or cut into a distal end that is hemispherical in shape. The increased flexibility of the flaps reduces leakage, which stretches the opening, and reduces the tendency to tear the slits wider, thus lengthening the life of the nipple and reducing leakage.

A bump and/or notch is formed in the base of the nipple in order to make the nipple easier to place on the liquid container and easier to remove from the container. The extension also reduces wear and tear on the nipple due to removal and replacement.

DETAILED DESCRIPTION OF THE INVENTION

The terms "upper", "lower", "horizontal", "vertical", "top", "bottom", "side", and the like, as used herein, refer to the directions or orientations of objects as they are viewed on a properly oriented, upright drawing.

Figure 1:
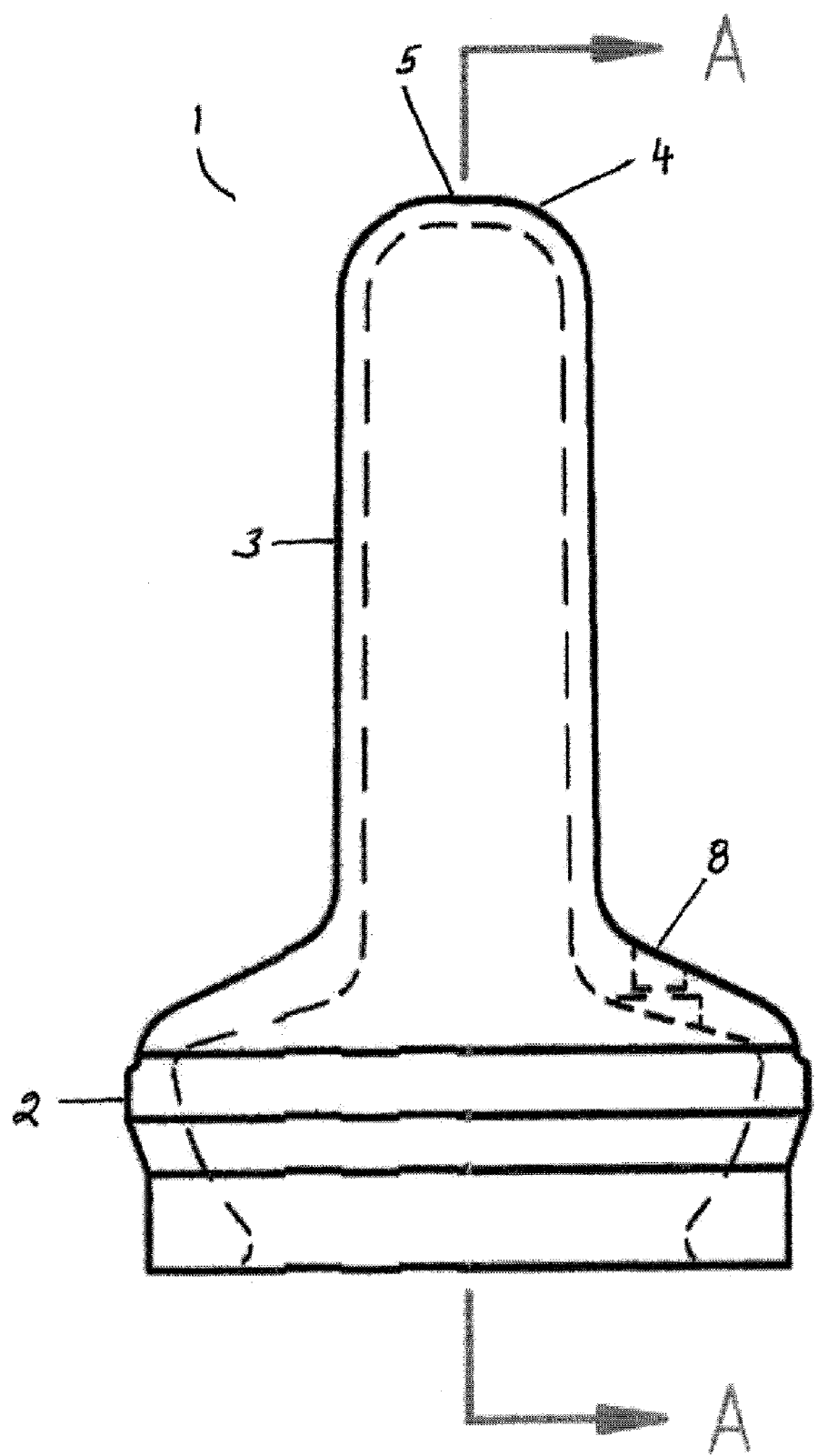
FIG. 1 is a side plan view of a nipple of the invention showing in broken lines an interior of the nipple and an air vent of the nipple.

FIG. 1 shows a generally circular calf or mammal nipple 1 comprising a base 2. A vertical barrel 3 extends upward from the base 2 and curves into a distal or upper end 4 of the barrel 3. The upper end 4 of the barrel has a central horizontal flat portion 5.

Figure 2:
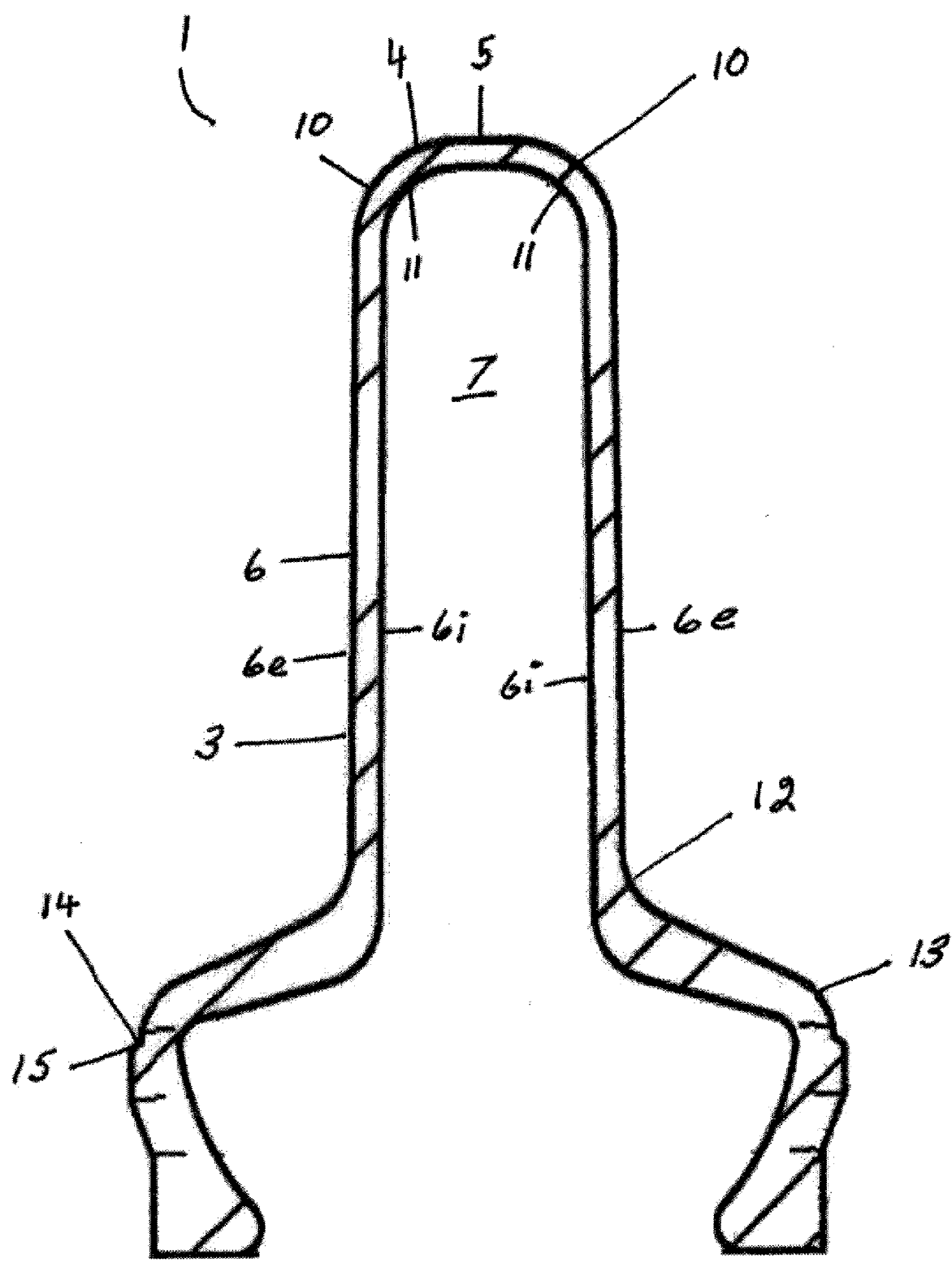
FIG. 2 is a cross section of the nipple taken along lines A-A of FIG. 1.

The barrel 2 is formed by a wall 6 having an interior side 6i and an exterior side 6e. The interior and exterior sides 6i and 6e of the wall 6 are shown in FIG. 2. The interior side 6i of the wall 6 forms a cavity 7 in the interior of the nipple 1 through which milk, milk replacer, or other liquid food flows when the nipple 1 is in use.

The nipple 1 contains an air vent 8, which is shown in broken lines in FIG. 1. It serves the conventional purpose of allowing air into the nipple 1 when the suckling of the calf or other mammal evacuates air from the cavity 7 of the nipple 1, reducing the air pressure in the cavity 7 and creating a partial vacuum therein, which can cause the nipple 1 to collapse and prevent the flow of liquid through the cavity 7.

The nipple 1 is made or formed of flexible and resilient material such as natural rubber, synthetic rubber, or a combination of the two. Thermoplastic elastomers, silicons, or other polymers may be used, provided they have the needed flexibility and strength. Flexible, resilient materials that are resistant to cleaning fluids and fats in the liquid feed may also be advantageously used to make the nipple 1. The materials used to make the nipple 1 must, of course, not be harmful to the animal that will use the nipple. The materials used to make nipple 1 must also be stronger and more resilient than materials used to make human baby nipples due to the greater strength of large mammals such as calves.

The overall length of nipple 1, from the bottom of the base 2 to the distal end 4 of the nipple 1 is approximately 102 to 103 mm, a length which has been found to be particularly suited to calves. The barrel 3 accounts for about 75% of the overall length of the nipple 1 and in a preferred embodiment is about 75 mm in length.

The horizontal flat portion 5 of the distal or upper end 4 of the nipple 1 has a downward curving periphery that merges into the vertical portion of the barrel 3. The exterior wall of the periphery curve has a radius 10 in the range of 9 to 10 mm. The interior wall of the periphery curve has as radius 11 in the range of 6.5 to 7.5 mm. In a preferred embodiment, the interior and exterior radii are 6.95 mm and 9.34 mm, respectively.

In a preferred embodiment, the thickness of the material in the vertical portion of the barrel 3 is approximately 2.6 mm, whereas the wall thickness of the material at the upper end 4 of the nipple 1 is approximately 2.4 mm, which is a reduction of about 8% in the thickness of the upper end 4 of the nipple 1. It is desirable to reduce the thickness of the upper end 4 of the nipple 1 by between 5 and 10% as compared to the thickness of the wall of the barrel 3.

The flat portion 5 of the distal end 4 of the nipple 1 has a diameter of in the range of 5 to 7 millimeters (mm), or about 20 to 25% of the inner diameter of the barrel 3 of the nipple 1.

The thickness of the wall of the base 2 of the nipple 1 is greater than the thickness of the barrel 3. In a preferred embodiment the thickness of the wall increases to about 6 mm at location 12 where the barrel 3 merges into the base 2 and may taper to about 4 mm at the location 13 where the base 2 turns downward to fit around the upper end of the bottle or liquid container.

At the location 12 where the barrel 3 merges into the base 2, a notch 14 forming a bump-out or extension 15 is formed. The notch 14 and the bump-out 15, have been found to be particularly useful in placing the thicker base 2 on the upper end of the bottle or other liquid container. The notch/bump-out 14, 15 allows a user to grip the base 2 more firmly and surely when the base 2 of the nipple 1 must be stretched to place it over the open or upper end of the bottle. The grip provided by the bump-out/notch 14, 15 is particularly helpful when the base 2 of the nipple 1 is wet, which is frequently the case when calves or other animals are being fed.

Figure 3:
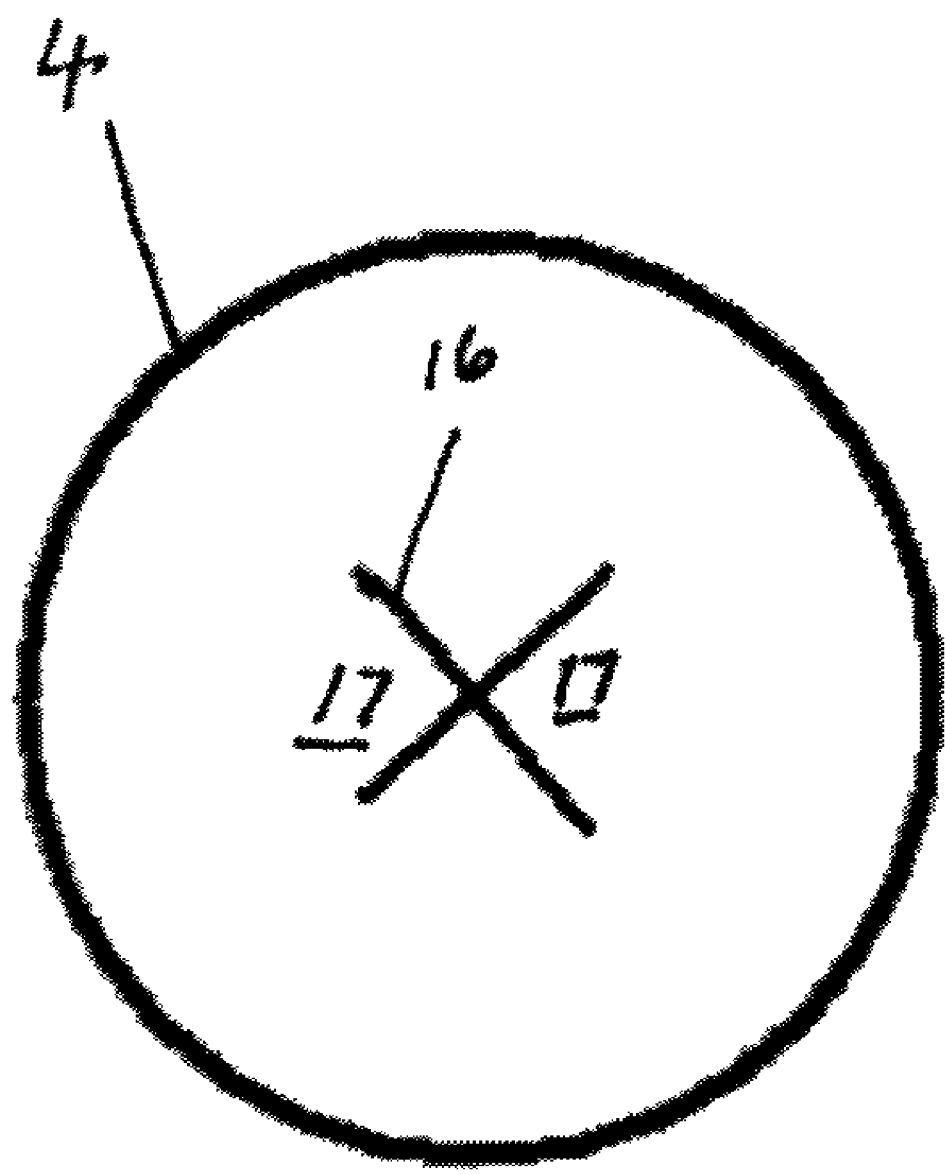
FIG. 3 is a schematic top view of the nipple showing the X-shaped slits.

As shown in FIG. 3, the preferred opening in the distal end 4 of the nipple 1 comprises a pair of slits which form an X shape 16 in the flat portion 5 of the end 4 of nipple 1. The four legs of the X shape are at 90° to one another. Each leg is about 2.5 mm to 3.5 mm in length, giving a total length of 5 mm to 7 mm for each of the two slits 16. In a preferred embodiment, the length of the each of the two slits 16 is 6 mm. The intersection of the two slits 16 is centered on the flat portion 5 of the distal end 4 of the nipple 1. The opening in the flat portion 5 of the end 4 may be made in other shapes or configurations, such as a circular, elliptical, a series of holes or perforations, or a single slit. However, the use of the X shape slits 16 has been found to be particularly advantageous in the nipple 1.

Since the material in the flat portion 5 of the end 4 of the nipple 1 is thinner and more flexible than the surrounding material of the barrel 3, the liquid passes more easily through the X shape silts 16, because it can more easily move the pointed flaps 17 between the slits 16. Accordingly, the flow of liquid through the end 4 of the nipple 1 is increased, which is an advantage with animal the size of calves. The thinner flaps 17 are also subjected to less bending stress than typical flaps, which are made of thicker material. The thinner flaps 17 return to their original X shaped configuration more surely and easily than thicker flaps and provide a better, closer seal when liquid is not flowing through the opening at the end 4 of the nipple 1. These advantages are enhanced when the distal end 4 of nipple 1 contains the flat portion 5, as here.

As compared to the typical hemispherical shape of the upper or distal end of conventional nipples, the flat portion 5 at the distal end 4 of the nipple 1 not only more nearly approximates the shape of a cow teat, but further reduces the bending stress in the end 4 of the nipple as the slits 16 open and close during suckling, thus prolonging the useful life of the nipple 1. The hemispherical shape of conventional nipples requires that the flaps bend along a hemispherical line which creates greated bending stresses than flaps in a flat plane which can bend on a straight line. Thicker, less flexible slits tend to permanently open or "gap" more quickly during repeated use and are more subject to tearing and breaking during repeated use.

The present invention having been described with reference to preferred forms thereof, it will be obvious that various changes and modifications may be made therein without departing from the spirit and scope of the invention as claimed.

What is claimed is:

1. A nipple for the suckling of liquid by a baby animal or young animal, the nipple comprising:
    a base;
    an upper end;
    a vertically extending barrel extending upward from the base and downward from the upper end and including a downward extending wall; and
    a common interior cavity formed by a flexible wall forming the vertically extending barrel and the upper end,
    the upper end having a horizontal flat central portion surrounded by a periphery, the flat central portion having a pair of slits forming an X shaped pattern,
    a diameter of the flat central portion being no more than 25% of an inner diameter of the vertically extending barrel,
    a thickness of the horizontal flat portion being between 5% and 10% less than a thickness of the downward extending wall,
    the periphery surrounding the horizontal flat central portion curving downward on a radius and extending vertically downward until merging with the vertically extending barrel.

2. The nipple of claim 1, wherein the horizontal flat portion has a diameter of between 5 mm and 7 mm.

3. The nipple of claim 1, wherein an outer radius of the upper end is between 9 mm and 10 mm.

4. The nipple of claim 3, wherein an interior radius of the upper end is between 6.5 mm and 7.5 mm.

5. The nipple of claim 1, wherein the thickness of the downward extending wall is approximately 2.6 mm and the thickness of the horizontal flat portion of the upper end is approximately 2.4 mm.

6. The nipple of claim 3, wherein the diameter of the horizontal flat portion of the upper end is between 5 and 7 mm.

7. The nipple of claim 1, wherein the diameter of the horizontal flat portion of the upper end is between 20% and 25% of the inner diameter of the barrel of the nipple.

8. The nipple of claim 1, further comprising a bump-out on the base, the bump-out for gripping the nipple.

9. The nipple of claim 1, wherein the slits forming the X shaped pattern are each between 5 mm and 7 mm in length.

10. The nipple of claim 2, wherein the slits forming the X shaped pattern are each between 5 mm and 7 mm long.

11. An animal nipple for the passage of liquid animal feed from the open end of a liquid container to the mouth of an animal suckling the nipple, the nipple comprising:
    a wall having an exterior side and an interior side, the interior side forming a cavity for the flow of liquid,
    the wall forming a vertical barrel with an upper end and a lower end, the upper end of the vertical barrel merging into a horizontal flat central portion formed at an upper end of the barrel, the flat central portion at the upper end of the barrel having slits in an X shaped pattern; and
    a base formed to enclose the open end of the liquid container, the lower end of the barrel merging into the base,
    wherein the thickness between the interior and exterior sides of the wall forming the vertical barrel is greater than the thickness between the interior and exterior sides of horizontal flat central portion at the upper end of the barrel.

12. The nipple of claim 11, wherein the horizontal flat portion has a diameter of between 5 mm and 7 mm.

13. The nipple of claim 11, wherein the exterior side of the wall of the upper end of the vertical barrel merges into the horizontal flat portion on the radius of between 9 mm and 10 mm.

14. The nipple of claim 11, wherein the interior side of the wall of the upper end of the vertical barrel merges in to the horizontal flat portion on a radius of between 6.5 mm and 7.5 mm.

15. The nipple of claim 11, wherein a distance between the interior and exterior sides of the wall forming the vertical barrel is approximately 2.6 mm and a distance between the interior and exterior sides of the wall of forming the horizontal flat portion is 2.4 mm.

16. The nipple of claim 11, wherein the thickness of the horizontal flat portion is between 5% and 10% less than the thickness of the wall forming the vertical barrel.

17. The nipple of claim 14, wherein the diameter of the horizontal flat portion is between 5 and 7 mm.

18. The nipple of claim 11, wherein wherein the diameter of the horizontal flat portion is between 20% and 25% of an inner diameter of the vertical barrel.

19. The nipple of claim 11, further comprising a bump-out on the base for gripping the nipple.

20. The nipple of claim 11, wherein a distance between the interior and exterior sides of the wall forming the vertical barrel is approximately 8% more than a distance between the interior and exterior sides of the wall of forming the horizontal flat portion.

* * * * *